Nov. 13, 1923.　　　　　　　　　　　　　　　　　　　　　　1,474,169
J. D. SARTAKOFF ET AL
AUTOMATIC WATER FILLER FOR STORAGE BATTERIES
Filed Nov. 5, 1920　　　　4 Sheets-Sheet 1
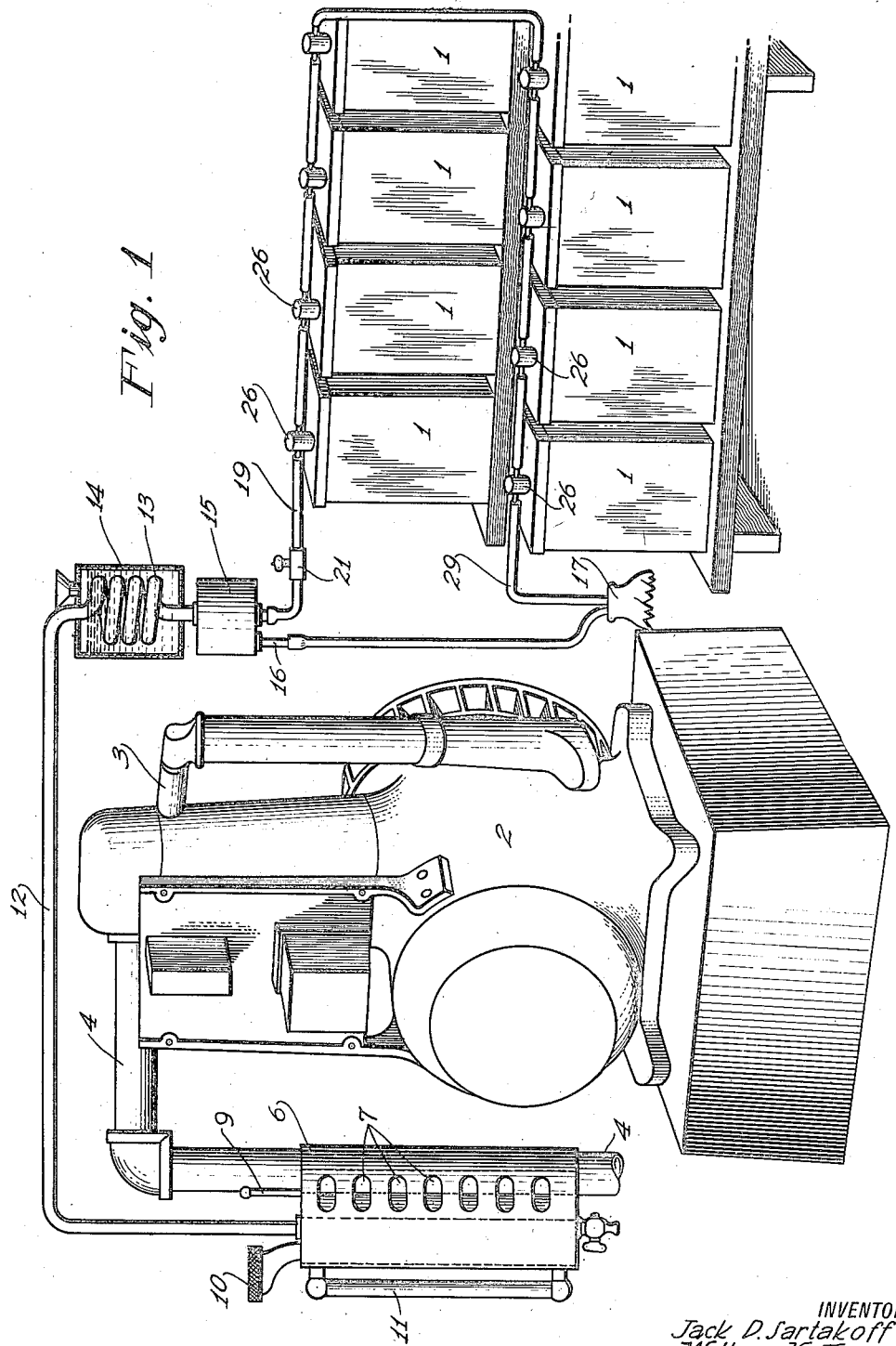
INVENTORS
Jack D. Sartakoff
William V. Forrest
BY
Jas. H. Griffin
ATTORNEYS Nov. 13, 1923.                                               1,474,169
          J. D. SARTAKOFF ET AL
    AUTOMATIC WATER FILLER FOR STORAGE BATTERIES
           Filed Nov. 5, 1920          4 Sheets-Sheet 2
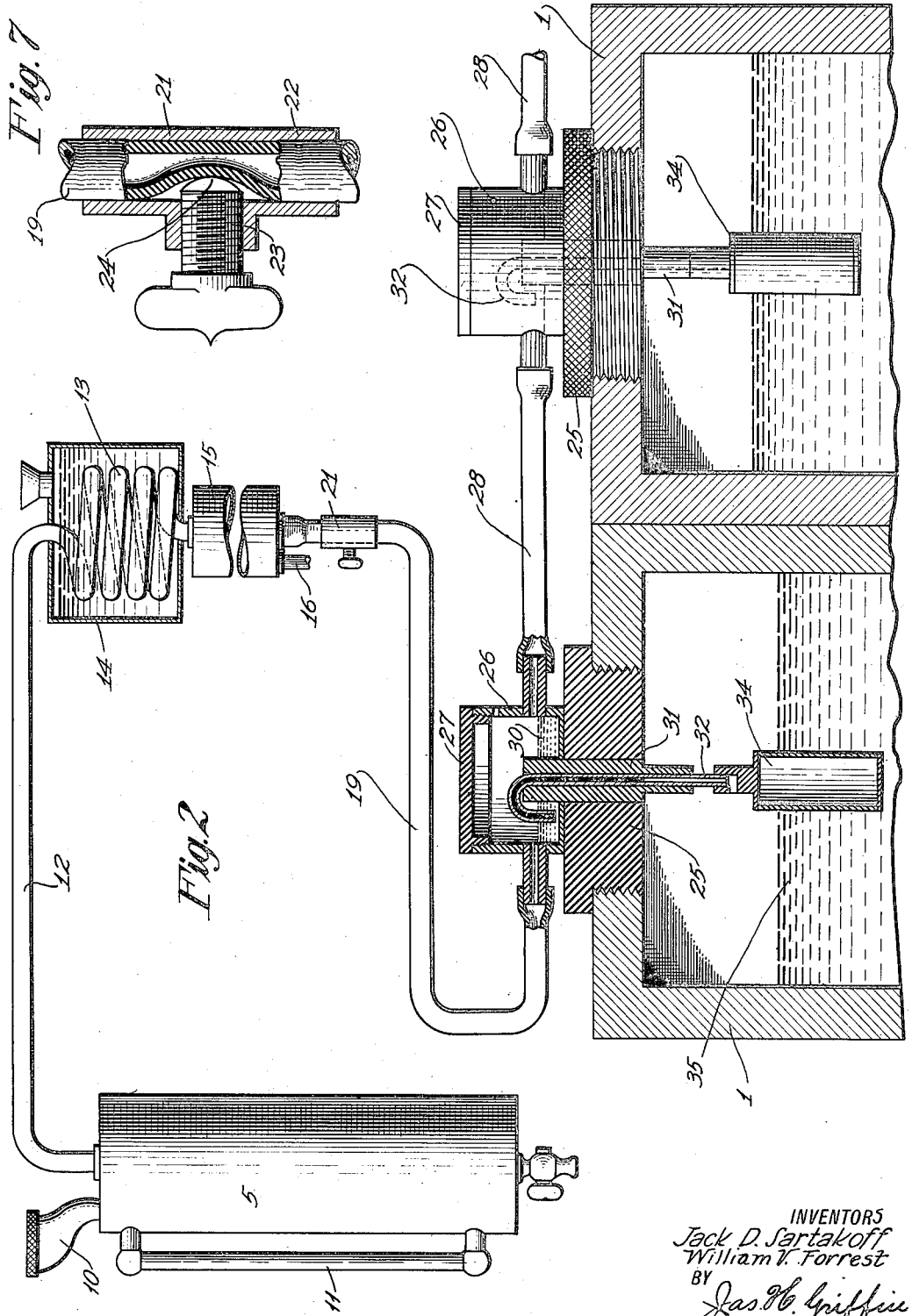
INVENTORS
Jack D. Sartakoff
William V. Forrest
BY
Jas. H. Griffin
ATTORNEYS Nov. 13, 1923.                                              1,474,169
            J. D. SARTAKOFF ET AL
         AUTOMATIC WATER FILLER FOR STORAGE BATTERIES
              Filed Nov. 5, 1920         4 Sheets-Sheet 3
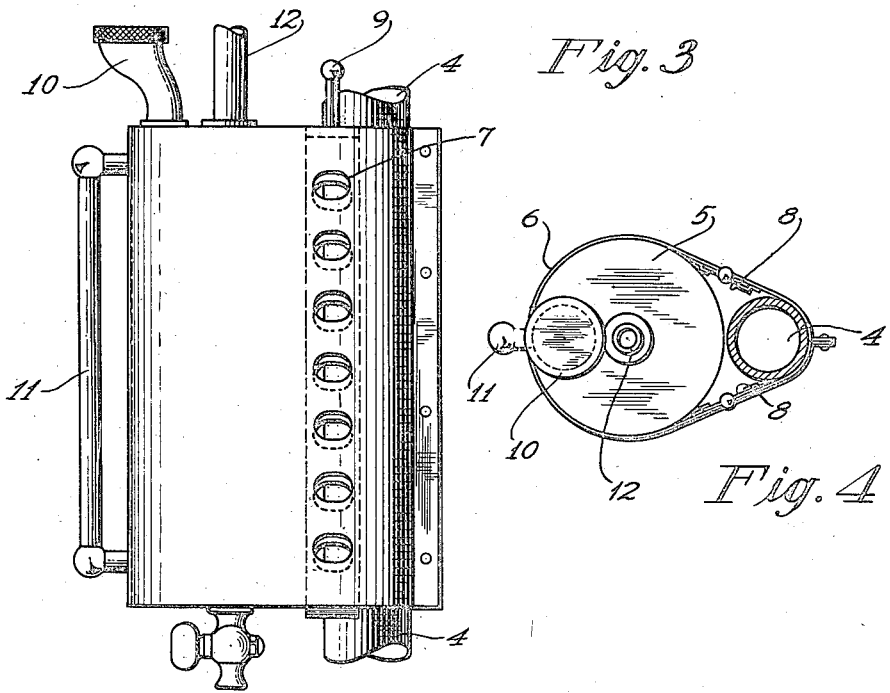
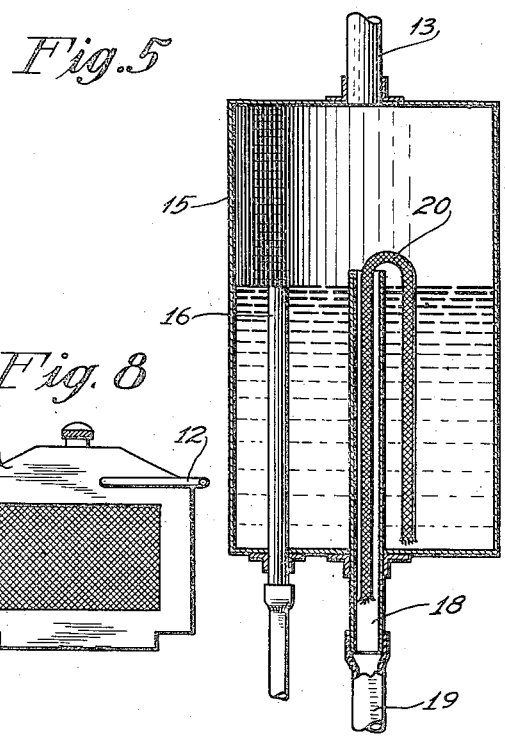
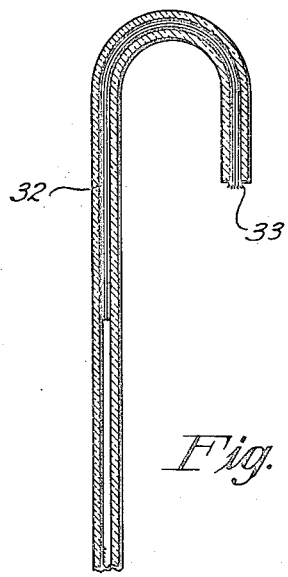
INVENTORS
Jack D. Sartakoff
William V. Forrest
BY
Jas. H. Griffin
ATTORNEYS Nov. 13, 1923.

J. D. SARTAKOFF ET AL 1,474,169

AUTOMATIC WATER FILLER FOR STORAGE BATTERIES

Filed Nov. 5, 1920    4 Sheets-Sheet 4

INVENTOR
Jack D. Sartakoff
William V. Forrest
BY Jas. H. Griffis
ATTORNEYS

Patented Nov. 13, 1923.

1,474,169

UNITED STATES PATENT OFFICE.

JACK D. SARTAKOFF, OF FOREST HILLS, AND WILLIAM V. FORREST, OF BROOKLYN, NEW YORK.

AUTOMATIC WATER FILLER FOR STORAGE BATTERIES.

Application filed November 5, 1920. Serial No. 421,875.

*To all whom it may concern:*

Be it known that we, JACK D. SARTAKOFF, a citizen of Russia, residing at Forest Hills, L. I., in the county of Queens and State of New York, and WILLIAM V. FORREST, residing at New York city, borough of Brooklyn, in the county of Kings and State of New York, have invented a certain new and useful Automatic Water Filler for Storage Batteries, of which the following is a specification.

The present invention is of particular value and utility when used in conjunction with light and power plant systems employing storage batteries, such as are in common use throughout the country in rural districts where electricity from municipal power plants is not readily available. Within the past few years, farmers and residents of outlying districts have employed electrical installations embodying a plurality of storage batteries and an associated generator or engine operated dynamo by means of which the batteries are periodically charged to be subsequently discharged gradually for lighting or power purposes. Such installations frequently employ a large number of storage batteries, varying in number, depending upon the amount of power required and it is not infrequent to find such an installation employing from twenty-five to fifty of such batteries.

In order to properly function, the electrolyte level in these batteries should be maintained constant, but, as is well known, the electrolyte is rapidly decomposed through electrolytic action and is lost through evaporation, so that cells must be inspected at frequent intervals and refilled to maintain the electrolyte level constant. It is the duty of an attendant or user to frequently inspect the cells which are usually made of glass, so that the electrolyte level may be readily observed, and, to remove the screw caps of each cell individually in order that sufficient distilled water may be introduced thereinto to cause the return of the electrolyte level to normal. In installations embodying large numbers of cells, this individual replenishing of the cells is a tedious and irksome task and requires considerable time.

Moreover, such battery cells should be replenished with distilled water, and, in rural places, or even in cities, distilled water is not always conveniently at hand, with the result that many users are prone to employ rain water, which to their belief, is practically the same as distilled water. However, it is well known that rain water embodies constituents not contained in distilled water and which are detrimental to the battery.

With the foregoing considerations in mind, the salient objects of the present invention, though not exclusive ones, are as follows. First, to provide a system whereby the electrolyte level of any number of batteries may be automatically and efficiently maintained at a predetermined point. Second, to provide such a system wherein this may be accomplished in an entirely automatic manner and without human intervention. Third, to provide such a system wherein distilled water for replenishing the batteries will be produced by a part of the complete self contained system and to thereby provide a complete self contained system capable of carrying out its intended functions incidentally to the usual operations of recharging the batteries.

Features of the invention, other than those adverted to, will be apparent from the hereinafter detailed description and claims, when read in conjunction with the accompanying drawings.

The accompanying drawings illustrate different practical embodiments of the present invention, but the constructions therein shown are to be understood as illustrative, only, and not as defining the limits of the invention.

Figure 1 shows more or less diagrammatically an electric light and power system embodying the present invention.

Figure 2 is a diagrammatic showing of the invention with a considerable portion of the mechanism shown in Figure 1 eliminated and many of the parts shown in section.

Figure 3 is a side elevation of a portion of the water distilling means of the system.

Figure 4 is a plan view of the structure shown in Figure 3.

Figure 5 is a reservoir from which the batteries are fed with distilled water.

Figure 6 is a detail view of a capillary tube preferably employed in the system.

Figure 7 is a section of valvular means preferably used.

Figure 8 shows a modified form of construction.

Figure 10:
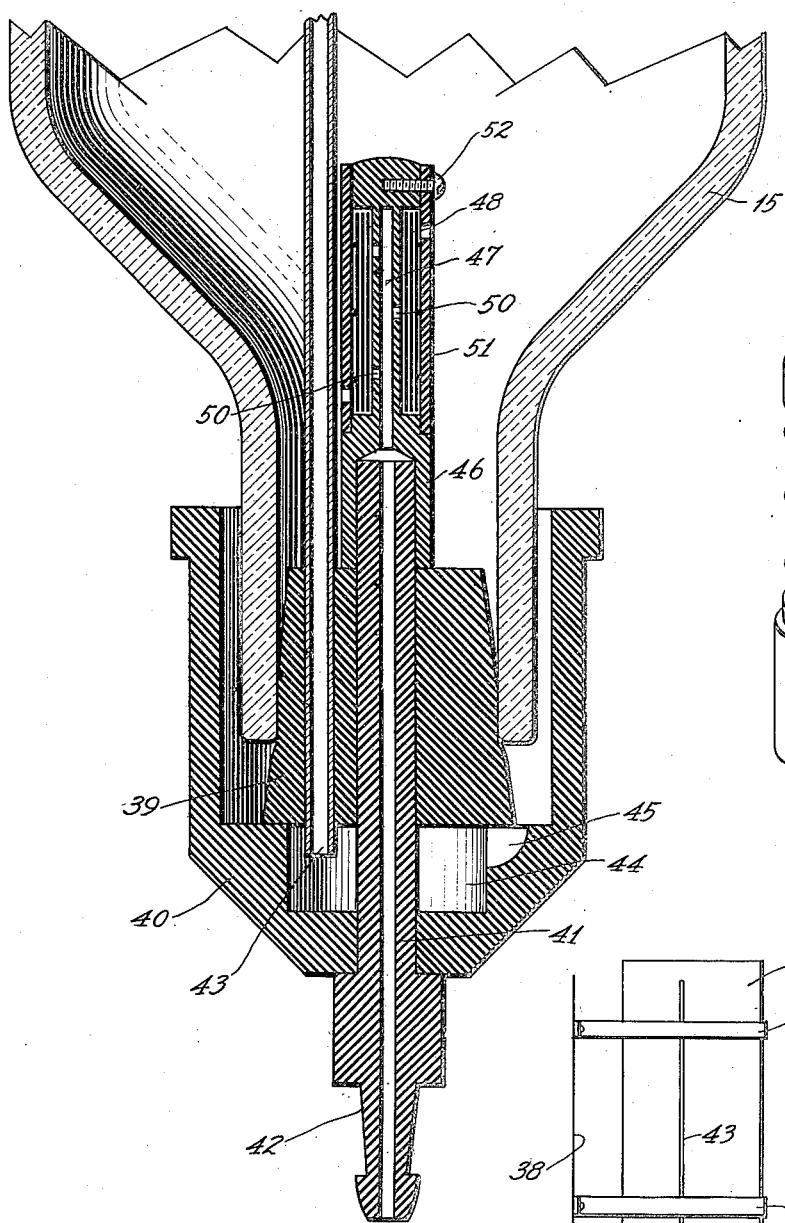
Figure 10 is a central section through the neck of the bottle and its outlet connections showing the manner of feeding water out of the bottle; and, Figure 11 is a detail view of one of the elements of the connection.

For the purpose of illustration, the present invention is shown in Figure 1 as associated with a well known form of Delco-light system. Such a system embodies a plurality of storage batteries 1, adapted to supply lighting or power current, the number of batteries employed depending upon the amount of current desired. With the batteries is associated a combined current generator and operating internal combustion engine 2, by means of which the batteries may be recharged when desired. The internal combustion engine which operates the dynamo is usually of the air cooled type gas engine, to the cylinder of which carburetted fuel is fed through an inlet 3, while the spent products of combustion find exit through the exhaust 4. In order to clarify the showing in Figure 1 of the drawings, all electric wiring has been omitted from the system.

In adapting the present invention to a system of this character, we find it economical and efficient to utilize the heat of the exhaust for vaporizing water which is subsequently condensed to provide the distilled water for feeding the batteries. An efficient manner of accomplishing this is shown in Figures 1, 3 and 4. In this showing, the tank 5 is bound to one side of the exhaust by means of a sheet metal apron 6 passed around both the tank and exhaust pipe 4, after the manner shown in Figure 4. This apron not only holds the tank in close proximity to the exhaust pipe, so that the heat from the latter will be imparted to the tank by contact therewith, but also serves as a housing to enclose the parts and prevent too rapid cooling from drafts of air. The apron is, however, preferably provided with vertically arranged series of holes 7, back of which operate slides 8 provided with corresponding holes and the slides may be moved by means of handles 9 to bring the holes of the slides and apron into and out of registration to allow or prevent the escape of heat, so that the heating of the tank 5 may be regulated. The tank 5 is adapted to be filled with water through a funnel 10 and is preferably provided with a sight gauge 11.

The water within the tank 5 is adapted to be converted into steam by the heat from the exhaust and this steam finds exit from the tank through a pipe 12, which leads to any suitable form of condenser shown in the drawings as a coil 13, mounted within a casing 14 adapted to contain water. The resulting condensate is received within a reservoir 15 shown in section in Figure 5. This reservoir is provided with an overflow pipe 16, which precludes flooding of the reservoir while the overflow may be collected in a bottle or jar 17, to which the pipe 16 leads, as shown in Figure 1.

Extending upwardly through the bottom of the tank and to a point above the liquid level therein, is a draw off pipe 18, which is connected preferably by means of a rubber tube 19 to the tank of the battery cells in series. As the distilled water to be fed to the battery cells usually requires very sluggish feed, because of the slow evaporation of the electrolyte in the cells, the distilled water from the reservoir 15 is preferably fed to the pipe 18, through the capillary action of a wick 20, whereby the water enters and flows through the pipe 19 drop by drop. The frequency of these drops may be regulated through the regulation of the wick.

Further control of the feed of water to the cells may be had through interposing in the tube 19 a valve 21 of the type shown in Figure 7. The valve is of novel construction and embodies a sleeve 22 having an inner diameter, substantially equal to the outer diameter of the rubber tube 19. One side of the sleeve is provided with a boss 23, which is interiorly threaded to receive an adjusting thumb screw 24 substantially the same in diameter as the inner diameter of the sleeve 22. The tube 19 is adapted to be passed through the sleeve 22 as shown in Figure 7, and by adjusting the thumb screw 24 the tube may be crimped or collapsed to vary its capacity and in this manner, the flow of water through the tube to the cells may be controlled. When a valve is used to control the flow of liquid through the tube as described, the capillary feed to the tube through a wick may be dispensed with or if the capillary feed is employed, the valve may be dispensed with.

The water is fed from the tube 19 into the interior of the cells individually by means associated with each cell. This means may be mounted on a cell in any suitable way, but is preferably organized as shown, so as to be mounted upon the screw cap 25 thereof. As shown in Figure 2, a small cup 26 is superimposed on each screw cap 25 and each cup is provided with a cover 27. The cups 26 of the several cells are connected with the feed tube 19 and to each other in series by short coupling tubes 28, in such manner that water fed into the first cup will form a pool therein while the overflow water will flow on to the next cup and so on until the last cup is reached from which the overflow may be led to the jar 17 by means of a short length of tubing 29 as shown in Figure 1. This construction results in the maintaining of a pool 30 of distilled water in each cup 26.

Extending through the bottom of each cup 26 is a tube 31, the upper end of which terminates beyond the level of the pool 30, while the lower portion of the tube passes through the screw cap 25 of the corresponding cell and terminates interiorly of the cell. Through each tube 31, is adapted to pass a tubular goose neck 32 shown in detail in Figure 6. The arms of the goose neck are of unequal length as shown and within the interior of the goose neck is positioned a wick 33 of wool, fibre, glass wool or any other suitable capillary material, so that the goose neck operates as a capillary tube. The lower end of the long arm of the goose neck is secured to a float 34 of any suitable construction adapted to float in the electrolyte 35 of the cell. The parts are so proportioned that when the electrolyte level in the cell recedes below a predetermined minimum, the float will be depressed to submerge the short arm of the capillary tube 32 in the pool 30, as shown in the left hand cell of Figure 2, whereupon the capillary tube will function to feed water from the pool 30 drop by drop into the cell. When the level of the electrolyte spent in this manner returns to normal, the float 34 through slow rising action will lift the lower end of the capillary tube 32 above the surface of the pool 30, as shown in the cell at the right hand side of Figure 2 and the feed of electrolyte will cease, until through decomposition or evaporation, the level of such electrolyte has again receded below the normal.

A marked advantage in the employment of float operated capillary tubes for the feeding of water into the cells individually is that by this construction, the employment of valves, which might stick to their seats or otherwise become inoperative, is rendered unnecessary. Moreover, if this invention is employed in conjunction with the storage batteries of motor vehicles, leakage in the feeding and consequent flooding of the batteries due to bobbing of the float and chattering of feed controlling valves are not to be contended with in the present construction wherein the valves are entirely eliminated.

When the present invention is employed in connection with a stationary light or power plant as illustrated in Figures 1 to 7 of the drawings, the device is entirely automatic in its operation and constitutes a self contained system requiring no manual intervention on the part of the operator, except that he keep sufficient water in the tank 5 to generate the necessary steam for the forming of distilled water. This tank may be of sufficient capacity so that it need be filled only at long intervals and the work incident thereto is in marked contrast with the labor heretofore required for the individual manual filling of the cells one at a time. The distilled water is produced while the engine is operating to run the battery for the purpose of recharging the cells and is stored in the reservoir 15 for use at such times as the engine is idle and the batteries discharging.

As hereinbefore pointed out the invention is of particular utility in stationary power or lighting systems, but is not restricted to this environment. It may be employed to advantage in connection with the storage batteries of motor vehicles, boats, launches, aeroplanes or the like. When used in any of these environments where an air cooled engine is employed, the heat for generating the steam from which the distilled water is condensed may be taken from the exhaust in the same manner as hereinbefore described or in any other suitable manner. In the event that the batteries are associated with a water cooled engine of a vehicle, the steam may be drawn directly from the top of the radiator as shown in Figure 8, wherein the radiator is designated 36. There are various ways in which steam may be supplied to the condenser without employing a tank corresponding to the tank 5 and the present invention is not restricted in this respect.

In the foregoing description, the invention has been dealt with in its preferable complete combination of elements, wherein means are provided for generating steam, condensing the steam and delivering the condensate into a vessel from which it is fed to the batteries. It will be understood, however, that part of the present invention which deals with the feed of the distilled water from the pool into the battery through a capillary tube may be employed in other combinations than in conjunction with steam generating and condensing means. That is to say distilled water may be produced in a separate apparatus and fed from the receptacle to the respective pools from whence it is fed into the battery cells.

Figure 11:
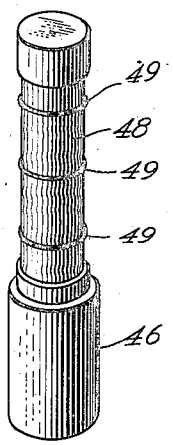
Figure 9:
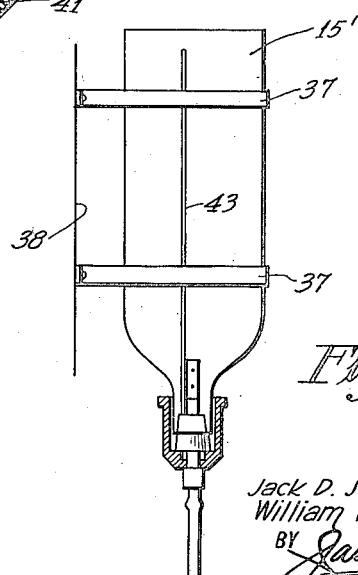
Figure 9 is a view showing the manner in which storage batteries may be fed from a bottle containing distilled water instead of from a receptacle into which condensed steam has been supplied.

In Figures 9 to 11 of the drawings, we have shown means whereby such water may be contained in a bottle adapted to be connected with the feed pipe 19 leading to the cells.

In the last mentioned figures of the drawings, 15′ designates an ordinary glass bottle adapted to take the place of the receptacle 15. This glass bottle may, however, be replaced by any suitable receptacle metallic or otherwise, but for the purpose of economy a glass bottle is preferred. This bottle is adapted to be supported in inverted position on suitable brackets or straps 37 from any suitable rigid part 38 and outlet means is so associated with the neck of the bottle as to govern the flow of water out of the same. This means is shown as consisting of a rubber cork or stopper 39 adapted to fit into the mouth of the bottle and with which stopper is associated an inverted cap 40. Through the stopper extends a tubular shank 41 of an outlet nipple 42. The water within the bottle is adapted to flow out through the nipple 42 and its shank 41 and air is allowed to enter the bottle for the purpose of replacing water drawn therefrom through a vent tube 43 which passes through the stopper 39 and extends to a point above the water level in the bottle. Air is adapted to enter the tube 43 through a chamber 44 formed in the cap which is in communication with the outer atmosphere through a cut out portion 45 extending under the edge of the stopper.

In order that the water will not feed too fast through the outlet nipple 42 and through the connection 19, and have a tendency to flood the pools and cause waste of the distilled water, means is preferably associated with the inner end of the shank 41 for governing or regulating the feed of water from the bottle. This means is in the form of a spool shaped member 46 which is recessed to be slipped over the upper end of the shank 41 and is provided with a longitudinal passage 47 extending almost but not through the entire length of the spool. Filter paper 48 is adapted to be wound about the reduced diameter of the spool for a predetermined number of turns and may be held in coiled position thereon by means of elastic bands 49 passed around the paper 48 as shown in Figure 11. The reduced portion of the spool is provided with apertures or inlet openings 50 and the water in the bottle 15′ is adapted to filter through the filter paper and pass through the holes 50 into the channels 47 whence it drops by gravity through the outlet nipple 42 to be fed through the connection 19 of the battery cell.

In the commercial industries filter papers is extensively employed in the filtration of liquids and semi-solids and it is well known that water will pass through filter paper and drop therefrom drop by drop. In carrying out the present invention, such paper is employed and it is wrapped around the spool 46, one or more times depending upon the rapidity at which it is desired to feed the water. Manifestly, the greater number of wrappings which are to be had will render the feed slower and if a more rapid feed is desired a less number of wrappings are employed. We have found in practice that by placing on the spool 46 a predetermined number of wrappings of filter papers that the water feed from the bottle 15′ may be regulated so as to more closely approximate the amount of water required by any particular number of cells and thereby eliminate the waste of water due to overflowing of the pools in the respective cells. The nicety of regulation of feed by this method is not obtainable by any known mechanical appliance.

Of course it will be understood that when the water is fed from the bottle in the manner described that the use of a valve corresponding to the valve 21 is not essential and that while the container 15′ is shown as a bottle, the water from the container 15 in Figure 2 of the drawings may be fed therefrom through filter paper so as to regulate the flow through the tube 19. In this event, the valve 21 would be dispensed with and the feed will be more uniform than could possibly be secured by the valve 21.

In practice, the coils of filter paper 48 are preferably adapted to be housed within and protected by a sleeve 51 slipped over the spool 46 and held in place by a screw 52. This sleeve is perforated to allow water to enter the interior thereof and impinge the filter paper 48.

It will be understood that the specific invention described may be modified in formal respects, such as by the substitution of equivalents and that parts of the complete mechanism described may be used alone, or in other environments, without departing from the spirit or substance of the broad invention, the scope of which is commensurate with the appended claims.

Having thus fully described the invention, what we claim as new and desire to secure by Letters Patent is:

1. A device for feeding storage batteries embodying a casing, adapted to contain a pool of water, a float adapted to be positioned within a cell and to be controlled by the electrolyte level therein, and a capillary tube associated with the float and operable thereby to be brought into cooperative relation with the pool to feed water into the cell, when the electrolyte level in said cell recedes below its predetermined minimum, and to be lifted free from cooperative relation with the pool when the electrolyte level has been restored to normal.

2. A device for feeding storage batteries embodying a battery cell, a casing associated with the cell and adapted to contain a pool of water, a float positioned within the cell, and a goose neck capillary tube provided with arms of unequal length, the longer arm being secured to the float and the shorter arm being maintained by the float in a position above the pool when the electrolyte level in the battery is at normal, said float being adapted to lower the shorter arm of the capillary tube into the pool when the electrolyte level recedes below normal for the purpose of feeding water from the pool into the cell.

3. A device for feeding storage batteries embodying a battery cell, a casing associated with the cell and adapted to contain a pool of water, a float positioned within the cell, and a goose neck capillary tube provided with arms of unequal length, the longer arm being secured to the float and the shorter arm being maintained by the float in a position above the pool when the electrolyte level in the battery is at normal, said float being adapted to lower the shorter arm of the capillary tube into the pool when the electrolyte level recedes below normal for the purpose of feeding water from the pool into the cell, and a wick positioned within the capillary tube for facilitating such feed.

4. A device for feeding storage batteries embodying a container for water, an outlet to the container, a connection to a battery cell, and filter paper positioned within the path of water from the container to the battery cell, whereby the flow of water to the battery is regulated.

5. A device for feeding storage batteries embodying a container for water, an outlet to the container, a connection to a battery cell, and filter paper positioned within the path of water from the container to the battery cell, whereby the flow of water to the battery is regulated, and means controlled by the electrolyte level in the cell for feeding water thus delivered into the cell.

6. A device for feeding storage batteries embodying a container for water, an outlet to the container, a connection to a battery cell, filter paper positioned within the path of water from the container to the battery cell, whereby the flow of water to the battery is regulated, and capillary means controlled by the electrolyte level in the cell for feeding water thus delivered into the cell.

7. A device for feeding storage batteries embodying a battery cell, a container for water, connections between the battery cell and the container for feeding water from the container to the battery cell to provide a pool of such water exteriorly of the cell, filtration paper positioned in the path of the water from the container to the cell for regulating the flow of such water, and capillary means controlled by the electrolyte level in the cell for feeding water from the pool into the cell when the electrolyte level in the cell recedes below a predetermined minimum.

8. A device for feeding storage batteries embodying a container for water, an outlet for said container which outlet is connected with a battery cell, a walled outlet passage extending into the container and provided with apertures through which the water leaving the container is required to pass, and filtered paper wrapped about said walled outlet passage and covering the apertures therein for the purpose of regulating the flow of water through said passages and the consequent feed of water to the battery cell.

9. The method of regulating the flow of a liquid which consists in interposing in the path of the liquid one or more thicknesses of filter paper through which the liquid is required to pass, whereby the flow of such liquid may be accurately regulated, the speed of such flow being determined by the amount of filter paper through which the liquid is required to pass.

10. The method of regulating the flow of liquid from a reservoir to a storage battery which consists in interposing in the path of the liquid a substance through which the liquid must flow and adjusting the quantity of such substance to give the desired flow.

11. A device for feeding storage batteries embodying a container for feed water, a connection leading from the container to a battery, and a flow controlling substance interposed in the path of the liquid from the container to the battery for controlling or regulating the amount of such flow to the battery.

In testimony whereof, we have signed our names to this specification.

JACK D. SARTAKOFF.
WILLIAM V. FORREST.